(12) United States Patent
Burchell et al.

(10) Patent No.: US 6,258,300 B1
(45) Date of Patent: Jul. 10, 2001

(54) ACTIVATED CARBON FIBER COMPOSITE MATERIAL AND METHOD OF MAKING

(75) Inventors: Timothy D. Burchell, Oak Ridge; Charles E. Weaver; Bill R. Chilcoat, both of Knoxville, all of TN (US); Frank Derbyshire; Marit Jagtoyen, both of Lexington, KY (US)

(73) Assignee: UT-Battelle, LLC, Oak Ridge, TN (US)

(*) Notice: Subject to any disclaimer, the term of this patent is extended or adjusted under 35 U.S.C. 154(b) by 0 days.

(21) Appl. No.: 09/384,391

(22) Filed: Aug. 27, 1999

Related U.S. Application Data

(63) Continuation of application No. 08/747,109, filed on Nov. 8, 1996, now Pat. No. 6,030,698, which is a continuation-in-part of application No. 08/358,857, filed on Dec. 19, 1994, now abandoned.

(51) Int. Cl.$^7$ .................................................. C01B 31/12
(52) U.S. Cl. ........................................ 264/29.6; 264/29.7
(58) Field of Search ........................ 428/304.4; 264/29.6, 264/29.7

(56) References Cited

U.S. PATENT DOCUMENTS

| | | | |
|---|---|---|---|
| 5,091,164 | * | 2/1992 | Takabatake . |
| 5,310,593 | * | 5/1994 | Tsujimoto et al. . |
| 5,446,005 | | 8/1995 | Endo . |
| 5,972,253 | | 10/1999 | Kimber . |

FOREIGN PATENT DOCUMENTS

| | | |
|---|---|---|
| 5-253478 | 5/1993 | (JP) . |

OTHER PUBLICATIONS

Burchell et al, "The Effect of Neutron Irradiation on the Structure and Properties of Carbon–Carbon Composite Materials," *Effects of Radiation on Materials: 16th International Symposium, STM STP 1175*, Philadelphia (1993).

Jasra et al, "Separation of Gases by Pressure Swing Adsorption," *Separation Science and Technology*, vol. 26, No. 7, pp. 885–930 (1991).

Kaneko et al, "Microporosity and Adsorption Characteristics Against NO, $SO_2$, and $NH_3$ of Pitch–Based Activated Carbon Fibers," *Carbon*, vol. 26, No. 3, pp. 327–332 (1998).

Thwaites et al, "Synthesis and Characterization of Activated Pitch–Based Carbon Fibers," *Fuel Processing Technology* (1993).

Wei et al, "Carbon–Bonded Carbon Fiber Insulation for Radioisotope Space Power Systems," *Ceramic Bulletin*, vol. 64, No. 5 (1985).

\* cited by examiner

*Primary Examiner*—Elizabeth M. Cole
(74) *Attorney, Agent, or Firm*—Akerman Senterfitt

(57) ABSTRACT

An activated carbon fiber composite for separation and purification, or catalytic processing of fluids is described. The activated composite comprises carbon fibers rigidly bonded to form an open, permeable, rigid monolith capable of being formed to near-net-shape. Separation and purification of gases are effected by means of a controlled pore structure that is developed in the carbon fibers contained in the composite. The open, permeable structure allows the free flow of gases through the monolith accompanied by high rates of adsorption. By modification of the pore structure and bulk density the composite can be rendered suitable for applications such as gas storage, catalysis, and liquid phase processing.

11 Claims, No Drawings

1

ACTIVATED CARBON FIBER COMPOSITE MATERIAL AND METHOD OF MAKING

This is a continuation of application No. 08/747,109 filed Nov. 8, 1996, now U.S. Pat. No. 6,030,698 which is a continuation-in-part of application Ser. No. 08/358,857 filed Dec. 19, 1994, now abandoned.

This invention was made with Government support under Contract DE-AC05-84OR21400 awarded by the United States Department of Energy to Martin Marietta Energy Systems, Inc. and the U.S. Government has certain rights in this invention.

TECHNICAL FIELD

This invention relates to the field of carbon fiber composite materials, activated carbon fiber composite materials, a method for making and uses of the activated carbon fiber composite.

BACKGROUND ART

Carbon fibers are produced commercially from rayon, phenolics, polyacrylonitrile (PAN), or pitch. The latter type are further divided into fiber produced from isotropic pitch precursors, and those derived from pitch that has been pretreated to introduce a high concentration of carbonaceous mesophase. High performance fibers, i.e. those with high strength or stiffness, are generally produced for PAN or mesophase pitches. Lower performance, general purpose fibers are produced from isotropic pitch precursors. These materials are produced as short, blown fibers (rather that continuous filaments) from precursors such as ethylene cracker tar, coal-tar pitch, and petroleum pitch prepared from decant oils produced by fluidized catalytic cracking. Applications of isotropic fibers include: friction materials; reinforcements for engineering plastics; electrically conductive fillers for polymers; filter media; paper and panels; hybrid yarns; and as a reinforcement for concrete.

More recently, interest has developed in activated forms of isotropic carbon fibers, where high surface areas can be produced by partial gasification in steam or other oxidizing gases. Activated carbon fibers have novel properties that make them more attractive than conventional forms (powders or large-size carbons) for certain applications. While porosity can be generated in most types of carbon fiber, low modulus fiber produced from isotropic pitch are particularly suited for activation because of their unique structure, where the random packing of small crystallites allows the development of an extensive pore structure.

Among the possible applications, activated carbon fibers are of interest for the adsorption and recovery of organic vapors; in environmental protection; the removal of $SO_x$ and $NO_x$ from flue gas; the improvement of air quality; and water treatment. Difficulties in handling and utilizing activated carbon fibers can be surmounted by their incorporation into composites, such as woven and non-woven fabrics, felt and paper. This invention provides a rigid, activated carbon fiber composite material that has an open and permeable structure and can be produced in single pieces to a given size and shape. The unique properties of the activated composite made from isotropic pitch derived carbon fibers, such as; narrow, unimodal pore structure in the fiber, high-surface area, rapid rates of adsorption and desorption, the ability to form specific shapes of high permeability and strength, suggest that, among other applications (notably in environmental protection), they may be suitable for molecular separation on the basis of size and shape.

Pressure swing adsorption (PSA) is a known process for separation of gases from multicomponent gas mixtures. The PSA apparatus relies on the physical process of adsorption, in which gases are selectively adsorbed onto a substrate from a gas stream, thus depleting the stream of one gaseous species. The adsorbed gas is then desorbed at a lower pressure into a second gas stream thus enriching it with the desorbed species. The desorption step regenerates the adsorbent material for reuse during the subsequent adsorption step. It is widely acknowledged that PSA technology has fully matured and that further advances in this technology will require the development of superior adsorbent and molecular sieve materials which have significantly higher surface areas combined with mean micropore width of 5–10 Å.

PSA systems typically comprise several adsorption beds, through which the gas stream is passed, allowing for the near complete separation of the selected gas species. The adsorbent materials used in a PSA unit are selected to have the appropriate mean micropore width (typically in the range of 5–10 Å) to selectively adsorb or sieve the required gas species and additionally must possess large surface areas. Currently available adsorbent materials include zeolites, with surface areas in the range of 10–350 $m^2/g$, and activated carbons with surface areas in the range of 500–1000 $m^2/g$. Conventional activated carbons and carbon molecular sieves are granular in structure. During operation in a PSA system, granular materials suffer attrition and can settle resulting in the formation of channels which allow the fluid stream to bypass the adsorbent.

Therefore, it is an object of this invention to provide an activated carbon fiber composite material which comprises activated carbon fibers with controlled porosity.

It is another object of the present invention to provide an activated carbon fiber composite material in a rigid, monolithic form.

It is yet another object of the present invention to provide an activated carbon fiber composite which defines an open and permeable structure.

DISCLOSURE OF THE INVENTION

Other objects and advantages will be accomplished by the present invention which serves to provide an improved carbon fiber composite material. The carbon fiber composite material of the present invention is comprised of porous carbon fibers bonded to form a monolithic, open and permeable structure. The carbon fiber composite defines surface areas greater than 1000 $m^2/g$. Several characteristics of the carbon fiber composite can be altered by altering selected conditions during the production and activation of the composite.

BEST MODE FOR CARRYING OUT THE INVENTION

A novel carbon fiber composite material and a method for making is described herein. The carbon fiber composite material is designed to controlled porosity. Moreover, the carbon fiber composite material defines a rigid, open, monolithic structure with high permeability.

The carbon fiber composite of the present invention is comprised generally of carbon fibers and a binder. The composite is strong and porous allowing fluids to easily flow through the material. At the same time, when activated, the carbon fibers provide a porous structure for adsorption.

Synthesis of the carbon fiber composite is generally comprised of mixing a selected carbon fiber in a water slurry with a carbonizable organic powder. The desired monolith configuration is molded from the slurry. The resulting green form is dried and removed from the mold. The composite is cured prior to carbonization under an inert gas. Once carbonized the composite is readily machined to the desired final configuration. The composite material is then activated to develop the fibers pore structure.

The fiber or fibers selected will depend upon the ultimate use of the resultant composite. The process described herein will focus on the production of a carbon fiber composite for use as a molecular sieve.

For use as an adsorbent or molecular sieve, it is preferable to use carbon fibers derived from a suitable isotropic pitch precursor.

The manufacture of pitch based fibers is well known in the art and is briefly described herein. Pitch is conventionally derived from a heavy petroleum fraction. Fiber forming methods include melt spinning and melt blowing. During both of these processes, the pitch is melted to a carefully controlled viscosity then forced through a number of fine capillaries to produce fibers as the pitch resolidifies. In the melt spinning process the fiber diameter is controlled by drawing the fibers down and winding them onto a reel as they form. The melt blowing process employs a stream of air which draws the fibers down as it blows them onto a moving belt to form a random mat of "green" pitch fibers. In both methods, extreme care must be taken to control the temperature and other conditions. Once formed, the green fibers are "stabilized", by heating the fibers in an oxidizing atmosphere, so that they are rendered thermosetting and will retain their fibrous form at the high temperatures used in the subsequent carbonization step. After carbonization, the fiber mats contain about 95% carbon by weight.

In the preferred embodiment, the isotropic pitch precursor is formed such that the resultant fibers define a diameter of approximately 10–25 $\mu$m.

The fibers can be in a stabilized or carbonized condition. The fibers are cut to a selected size. For the preferred embodiment, it is preferable to cut the fibers to an average length of approximately 400 $\mu$m, and can range from 100 to 1000 $\mu$m.

The chopped carbon fibers are mixed in a water slurry with a carbonizable organic powder, such as pitch, thermosetting resin or phenolic resin. In the preferred embodiment, powdered phenolic resin is utilized.

The preferred forming method is vacuum molding, where the slurry is transferred to a molding tank and the water is drawn through a porous mold under vacuum. The material can be molded into any configuration desired such as a cylinder or plate. Obviously, the configuration will be determined by the configuration of the mold into which the slurry is transferred. Other methods of forming can be utilized such as pressure forming or various forming methods practiced in the plastics industry.

The resulting green form is dried. In the preferred embodiment, the form is dried in air at 50° C. Once dried, the form is removed from the mold.

The dried green form is then cured to produce a cured monolith. In the preferred embodiment, the composite is cured at approximately 130° C. in air.

The resulting composite is carbonized under an inert gas. Preferably, the composite is carbonized for 3 hours under nitrogen at 650° C. to pyrolize the resin binder.

The composite formed by the above process defines voids between the fibers (interfiber pores) which allow free flow of fluid through the material and ready access to the carbon fiber surface. The voids range from 10–500 $\mu$m in size. Further, the individual carbon fibers are held in place by the pyrolized resin binder and thus cannot move or settle due to the flow of gases through the material. The carbonized bulk density of the composite material is typically 0.3–0.4 g/cm$^3$. Assuming a theoretical density of 2.26 g/cm$^3$ (density of a single crystal pure graphite) for the composite of the present invention, at a density of 0.3–0.4 g/cm$^3$, the composite would range from approximately 82–86% porosity.

Following its manufacture, the monolithic carbon fiber composite is activated. Activation of the carbon fibers is accomplished by steam, carbon dioxide, oxygen or chemical activation. The resulting chemical reactions remove carbon and develop pores in the carbon fibers, which are classified by diameter: micropores (less than 2 nm), mesopores (2–50 nm) and macropores (greater than 50 nm).

In the preferred embodiment, the composite is steam activated in a steam/nitrogen atmosphere. The preferred activation conditions are: 800–950° C., steam at a partial pressure of 0.1–0.9 atmospheres and for durations of 1–3 hours. Burn off is calculated from the initial and final weights. Up to approximately 60% burn off, the surface area increases with burn off. The main concern with a higher burn off is the reduction in the strength of the composite. Using the manufacturing process described herein, the reduction of crush strength of the composite is almost linear with burn-off, rather than the strong exponential dependance more typically exhibited by thermally oxidized carbons. At 56% burn-off, the BET $N_2$ surface area was 1670 m$^2$/g. A crush strength of approximately 1 MPa is retained after activation. The resultant fibers in the composite define a high micropore volume, a low mesopore volume and no macropores.

The activation conditions can be varied by changing the activation gas, its concentration, the flow rate, the temperature and the optional presence of a catalyst to influence total surface area and pore size distribution. Further, the use of post activation treatments can be implemented. For example, further heating or the introduction of chemicals could affect the pore size distribution and surface chemistry.

Once carbonized or activated, the composite can be machined to any desired shape, forming a monolithic carbon fiber composite.

The resultant activated carbon fiber composite is ideal for use as an adsorbent or molecular sieve in the Pressure Swing Adsorption (PSA) process. It has a very high surface area, a narrow micropore distribution centered around mean pore widths of 5–10 Å, a high micropore volume, low mesopore volume, a high gas adsorption/desorption rate, and a permeable macrostructure through which fluid can easily pass. Further, because the carbon fiber composite is a monolith, it overcomes the settling problems associated with beds of granular activated carbon and carbon molecular sieves and thus bypass flows and pressure drops are eliminated. Moreover, the mean micropore size is controllable through the activation process thus allowing for the carbon fiber composite to be tailored for adsorption or sieving of specific gas molecules. The density and void size of the carbon fiber composite can be altered by varying the fiber length, binder content and molding conditions. The most likely initial applications are in the field of gas separations.

Although use of the carbon fiber composite as an adsorbent in the PSA process has been emphasized, with variations to process described above, there are several alternative uses. Carbon fibers derived from coal tar pitch, rayon, polyacrylonitrile (PAN) or heavy oils such as oil shale residue and refinery residue can be utilized in the production of the composite. Further, the fibers can be vapor grown. The fibers or a blend of different carbon fibers can be utilized to control the characteristics of the resultant carbon fiber composite. More specifically, the strength, thermal conductivity, pore size distribution, density and electrical properties are examples of the characteristics that can be modified or controlled with the appropriate carbon fiber or blend of carbon fibers.

By selecting a different carbon fiber and altering selected parameters in the production process, the carbon fiber composite can be modified for use in a variety of applications. For example, the carbon fiber composite can be utilized in gas purification applications and specifically air purification, especially in confined spaces where the higher rates of adsorption on activated carbon fiber composites offers potential space savings. Further, a composite with a bulk density greater than 1 gm/cm$^3$ and an active surface area greater than 1000 m$^2$/g can be utilized for gas storage. For example, the composite could be utilized as a $CH_4$ or $H_2$ storage medium or as a $CH_4$ purification medium for $CH_4$ from various sources, including land fill gases or coal bed gas. Further, a mesoporous carbon fiber composite is suitable for use in a liquid phase applications or as a catalyst support.

From the foregoing description, it will be recognized by those skilled in the art that a carbon fiber composite, and a method for making offering advantages over the prior art has been provided. Specifically, the carbon fibers in the composite provides a high surface area and is in a rigid, permeable, monolithic form.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, we claim:

1. A process for preparing an activated carbon fiber composite material comprising the steps of:

selecting a carbon fiber fabricated from at least one precursor selected from the group consisting of isotropic pitch, polyacrylonitrile, rayon, heavy oils, oil shale residue, and refinery residues;

reducing said carbon fiber to a selected length by chopping or milling thereby providing a multiplicity of carbon fibers;

mixing said multiplicity of carbon fibers with a carbonizable organic powder and water thereby producing a slurry;

vacuum molding said slurry thereby producing a green monolith;

drying said green monolith;

curing said green monolith thereby producing a cured monolith;

carbonizing said cured monolith thereby producing a carbon fiber composite defining an open, permeable structure; and activating said carbon fiber composite whereby said carbon fibers are made porous.

2. The process for preparing an activated carbon fiber composite of claim 1, wherein said carbon fiber is thermally activated before the step of fiber size reduction.

3. The process for preparing an activated carbon fiber composite of claim 1, wherein said carbon fiber is chemically activated before the step of fiber size reduction.

4. The process for preparing an activated carbon fiber composite of claim 1, wherein said carbon fiber composite is thermally activated after the step of curing.

5. The process for preparing an activated carbon fiber composite of claim 1, wherein said selected length for cutting said carbon fiber is less than 1 millimeter.

6. The process for preparing an activated carbon fiber composite of claim 1, wherein said carbonizable organic powder is phenolic resin.

7. The process for preparing an activated carbon fiber composite of claim 1, wherein said green monolith is dried at 50° C. in an oven.

8. The process for preparing an activated carbon fiber composite of claim 1, wherein said green monolith is cured at about 130° C.

9. The process for preparing an activated carbon fiber composite of claim 1, wherein said cured monolith is carbonized at about 650° C. for about 3 hours under an inert gas.

10. The process for preparing an activated carbon fiber composite of claim 1, wherein said carbon fiber composite is activated by a steam activation process, said steam activation process resulting in chemical reactions which remove carbon and develop pores in each of said multiplicity of carbon fibers, said steam activation process taking place at about 800–950° C. at a partial pressure of steam about 0.1–0.9 atmospheres for a duration of about 1–3 hours.

11. The process for preparing an activated carbon fiber composite of claim 10, wherein said composite is subjected to post activation heat treatment at temperatures above the temperature of said activation process.

* * * * *